United States Patent [19]

Hope et al.

[11] 4,121,764
[45] Oct. 24, 1978

[54] SOLAR HEATING SYSTEM

[76] Inventors: Henry F. Hope, 3192 Huntingdon Rd., Huntingdon Valley, Pa. 19006; Stephen F. Hope, 2421 Wyandotte Rd., Willow Grove, Pa. 19090

[21] Appl. No.: 605,713

[22] Filed: Aug. 18, 1975

[51] Int. Cl.² ............................................. F24J 3/02
[52] U.S. Cl. .................................. 237/1 A; 126/270; 98/96; 98/33 A; 98/31
[58] Field of Search ............... 126/270, 271; 237/1 A; 98/29, 31, 33 A, 96; 52/303, 304

[56] References Cited

U.S. PATENT DOCUMENTS

| | | | |
|---|---|---|---|
| 246,626 | 9/1881 | Morse | 237/1 A |
| B 512,745 | 1/1976 | Deminet et al. | 126/271 |
| 2,559,869 | 7/1951 | Gay | 126/270 |
| 2,559,871 | 7/1951 | Gay | 237/1 A |
| 3,107,052 | 10/1963 | Garrison | 126/271 |
| 3,832,992 | 9/1974 | Trombe et al. | 126/270 |
| 3,863,621 | 2/1975 | Schoenfelder | 126/270 |
| 3,919,998 | 11/1975 | Parker | 126/270 |
| 3,935,897 | 2/1976 | Pulver | 126/270 |
| 3,955,555 | 5/1976 | Bostrom | 126/270 |
| 3,981,445 | 9/1976 | Custer | 98/96 |
| 4,020,989 | 5/1977 | Kautz | 126/270 |
| 4,049,195 | 9/1977 | Rugenstein | 126/270 |

*Primary Examiner*—John J. Camby
*Assistant Examiner*—Henry C. Yuen
*Attorney, Agent, or Firm*—Weiser, Stapler & Spivak

[57] ABSTRACT

A parapet-like component for a building which includes an air plenum. The plenum is a multipurpose structure which allows for transfer of a predetermined amount of heat from the outside into the building. The plenum includes translucent surfaces which allow light to enter the building and concurrently provide insulation against loss of heat from within the building towards the outside. The parapet-like component can be operated reversibly in allowing for cooling of the interior of the building when its temperature exceeds that of the outside.

The structure is highly functional and also is aesthetically pleasing, having the general appearance of a mansard.

The novel design of the invention allows for and incorporates the use of traditional and widely accepted building and architectural practices and esthetics.

In a preferred embodiment, the plenum has an exterior wall of a tinted plastic or glass and a clear inside wall of plastic or glass.

The structure is relatively easy to conform to conventional architectural plans.

Considerable savings in both heating and lighting costs are achievable by the system without increase in building construction costs.

37 Claims, 5 Drawing Figures

SOLAR HEATING SYSTEM

BACKGROUND OF THE INVENTION

This invention relates generally to solar heating systems, and more particularly relates to a combination direct type and indirect type of solar heating.

Prior workers in the art have long sought methods of employing the heat energy from the sun for building heating purposes. In U.S. Pat. No. 1,467,005, Lawrance discloses a solar heating arrangement in which a space is defined between an inner wall and an outer louvred wall. The air within the space is heated by impinging directly the sun's rays upon a plurality of collectors. This arrangement is cumbersome in design and due to the cost of construction, has not achieved wide acceptance. Additionally, the exterior louvers tend to detract from the appearance of the building and create inherent architectural difficulties.

In U.S. Pat. No. 2,559,869, a building is disclosed with two double walled spaces within which air is heated by the sun. One space is in the roof section between the outer roof and an inner wall. The other section is between a double glazed outer window wall and an inner wall which is not glazed. In this device, only the thickness of the wall is available for use as the air heating chamber and so the amount of air actually heated is limited. Further, such a structure tends to increase building costs by requiring additional construction materials. There is no combination of a translucent outer wall and a translucent inner wall.

In U.S. Pat. No. 2,680,656, another type of solar heating system for a building is employed wherein a heat trap is placed in the roof and comprises a glass outer face and a series of overlapping inner glass plates. The inner glass plates are painted black in portions and are so placed as to intercept essentially all of the sunlight entering the heat trap. Such a design is incapable of utilizing natural sunlight for building lighting purposes.

A double glazed window box structure is disclosed in U.S. Pat. No. 3,239,144 which establishes a heating system based on the presence of a multiplicity of heat absorbing plastic sheets placed between the inner and outer glass panels. There is no indication in this patent that the air within the double glazed window space is circulated into the interior of the building. In U.S. Pat. No. 3,243,117 a double window wall is disclosed with a two foot space therebetween. A ventilator is employed in communication with the air space and this ventilator is intended to keep air between the panes clean and not for utilizing the air to heat the interior of the building.

U.S. Pat. No. 3,832,992 discloses a modular double wall construction in which an outer glass surface admits solar heat into an air space between the outer glass wall and an inner wall. The air in that space then enters the interior of the building for heating purposes. It is noteworthy that the window sections do not form part of the double wall structure.

There have been a number of other systems which have been designed for heating buildings partly or wholly by the use of solar radiation. These designs have more recently become of greater interest in view of the steadily increasing heating costs due to the rise in the cost of fossil fuels. Such solar heating systems designs have proved theoretically feasible, but to data, they have not become commercially successful, usually because of the great expenditures required to construct a building which is capable of being satisfactorily heated by solar radiation and also because of the high cost of the solar heat system equipment itself.

In prior art buildings adapted to be heated entirely by solar radiation, a special room or panel area is provided for the collection of solar radiation and means is provided for converting the solar radiation into heat. The converted solar heat is usually transferred to a fluid by means of which the heat is conducted to some point of storage from where it can be distributed within the building as required.

All of the prior art solar heating systems of which we are familiar tend to be complicated in design and quite costly in construction.

Recently an article was printed in the June 1, 1975 edition of the New York Times, pages 33 and 36 which discusses the use of glass that has been coated with a tinted or reflective film as windows to reduce objectionable glare. The article suggests reflecting the sun rays, which is opposite to the objects of the invention.

SUMMARY OF THE INVENTION

The present invention relates generally to solar heating systems, and more particularly, is directed to a double walled plenum comprising two spaced translucent panels which define a plenum chamber having an air space which is heated by solar radiation for building heating purposes.

The present invention includes a specially designed, parapet-like component for a building in the form of a peripheral roof structure. The peripheral roof structure defines an elongated air plenum and includes a first, outer translucent wall. The first translucent wall allows maximum transfer of solar energy and of light into the building. The outer wall is preferably angularly inclined from the vertical to obtain greater efficiency in utilizing solar heat energy. The plenum is a multi-purpose structure which allows for the transfer of a predetermined amount of heat from the exterior into the building interior. The plenum also allows heat into the building and concurrently provides insulation against the loss of heat from the inside towards the outside. The parapet-like component is reversible in operation in that it allows for cooling the interior of the building when the building interior temperature exceeds the exterior temperature.

The first wall preferably is fabricated of tinted materials to increase absorption of the solar heat and to decrease glare. The parapet-like component includes a second translucent wall which forms the inner vertical closure of the air plenum. The second wall is spaced inwardly from the inclined first wall and is preferably fabricated of clear translucent material. In this manner, some of the solar energy can pass directly through both of the translucent walls of the plenum chamber to heat the interior space of the building by direct radiation.

The exterior translucent panel provides a decorative effect which may be utilized by the designer of the building to provide striking, aesthetically pleasing, design features without any increase in building cost inasmuch as the peripheral structure replaces more conventional building materials which would otherwise be employed.

It is noteworthy that natural light will pass through both translucent walls of the plenum chamber and into the interior of the building. Accordingly, the normal electrical lighting load will be significantly decreased, thereby resulting in decreased lighting costs. The plenum chamber provides an insulating air space defined between the exterior and interior translucent panel walls which acts to prevent heat loss at the window areas. Light can enter the building at the plenum chamber through an insulating air space in a manner never before contemplated. Even when there is no direct sunlight, the plenum chamber serves to admit daylight without the usual heat loss encountered at uninsulated windows.

The outer wall is preferably fabricated of tinted sheet materials so as to be heat attracting and glare preventing.

The rays from the sun heat the air within the plenum chamber directly by radiation and in a preferred embodiment, the plenum chamber extends completely about the outer periphery of the building at the roof thereof to take full advantage of the available solar energy by presenting at least a portion of the plenum chamber to direct impingement of solar rays at all times during normal daylight hours.

In a preferred embodiment, the exterior and interior plenum chamber walls can be fabricated of plastic sheet material such as "Plexiglas" acrylic plastic as manufactured by Rohm and Haas Company, Philadelphia, Pa. Gray and bronze "Plexiglas" colors have been developed to provide solutions to problems associated with solar heat gain and glare control in window glazing, skylights and other transparent building components.

The following chart lists the visible light and solar energy transmittance values for the range of densities of both neutral gray and bronze "Plexiglas". The values are approximately constant for all sheet thicknesses of each density. By employing this chart, total heat transfer and glare reduction factors can be calculated.

| "Plexiglas" | | Transmittance | |
| --- | --- | --- | --- |
| Color | Number | Visible Light | Solar Energy |
| Neutral Gray | 2538 | 16% | 27% |
| Neutral Gray | 2537 | 33 | 41 |
| Neutral Gray | 2094 | 45 | 55 |
| Neutral Gray | 2514 | 59 | 62 |
| Neutral Gray | 2515 | 76 | 74 |
| Bronze | 2370 | 10 | 20 |
| Bronze | 2412 | 27 | 35 |
| Bronze | 2404 | 49 | 56 |
| Bronze | 2539 | 61 | 62 |
| Bronze | 2540 | 75 | 75 |
| Colorless "Plexiglas" | | 92 | 85 |

A fan communicates with the interior of the plenum chamber and is connected in a manner to pull the solar heated air from within the plenum chamber for building heating purposes by convection. If the plenum chamber is of extended length, more than one heating fan can be employed for this purpose if so desired. The fan or fans may be employed to pressurize conventional ductwork through which the heated air from within the plenum chamber can be directed throughout the building for building heating purposes. Thermostats or other heat sensitive devices mounted within the plenum chamber may be conventionally employed to permit automatic operation of fans of the solar heating system in well-known manner.

The present invention provides an unexpected result when employing a tinted acrylic plastic material for the exterior plenum chamber wall. Traditionally, tinted materials have been utilized to reflect and reject solar heat resulting from direct impingement of rays from the sun. Contrary to the usual practice, in the instant structure, the colored "Plexiglas" or other tinted exterior translucent materials are designed to attract the heat interiorly of the plenum chamber and then they utilize the heated air within the plenum chamber for building heating purposes.

Preferably, the first or outer wall of the plenum chamber is inclined from the vertical to present the general appearance of a mansard. As employed herein, "parapet-like" or "mansard" defines in accordance with the invention a structural component having a sloping outer side wall and top and bottom surfaces which may be either horizontal or sloping. The present invention utilizes a common architectural device in an entirely different manner.

The parapet-like structure or mansard of the present invention is illustrated in position at the roof line of the building. However, a mansard positioned at other levels other than the roof is within the scope and meaning of this invention. It will also be noted that more than one mansard can be constructed in conjunction with a building in accordance with the teachings of the present invention.

As employed herein, "conduction" means passing heat through a body such as a translucent panel from air on one side of the body to the air on the other side. "Convection" means transferring heat from one location to another by movement of a quantity of heated air. "Radiation" as herein employed means the heat energy given off by the sun's rays and absorbed directly either within the plenum chamber or within the building.

As is shown above, the construction of the invention has several variables like the nature of the translucent wall, its tinting (e.g., gray, bronze, etc.) the inclination of the wall and such variable factors. These variables are predesigned for achieving the intended objective so that the translucent surface, in accordance with the invention, permits a passage of a predetermined amount of solar energy to heat the air within the air space and of light into the building. It is also within the contemplation of the invention to favor the passage of heat over that of light, or vice versa, this also being within the concept of "predetermined" or "predesigned" passage. Also, as disclosed herein, is that the passage of heat can be in either direction, inwardly when heating the building, and outwardly, when cooling it. Also noteworthy is that the structural component of the building allows for concurrent passage of light and heat, another distinction over conventional construction systems.

It is an object of the present invention to provide an improved solar heating system of the type set forth.

It is another object of the present invention to provide a novel solar heating system that is extremely basic in design so that buildings can be easily equipped with solar heating systems without significantly adding to the cost of construction.

It is another object of the present invention to provide a novel solar heating system including a plenum chamber, the said plenum chamber being of attractive design to impart an aesthetically pleasing architectural appearance to the building without increased building costs.

It is another object of the present invention to provide a novel solar heating system adaptable for use with buildings including a double walled plenum chamber wherein both walls are fabricated of translucent materials to define an air space therebetween suitable for solar heating purposes.

It is another object of the present invention to provide a novel solar heating system including a plenum chamber forming a portion of the building construction, the plenum chamber comprising a tinted translucent exterior panel and a clear translucent interior panel, the exterior and interior panels defining a chamber therebetween within which solar energy is employed for building heating purposes.

It is another object of the present invention to provide a novel solar heating system that is aesthetically pleasing, that forms an integral portion of the building, and that is suitable for introducing both heat and light into the building when the sun is shining and that insulates the building when the sun is not shining.

It is another object of the present invention to provide a novel solar heating system including a plenum chamber having translucent panels, said plenum chamber permitting direct building lighting by passage of sunlight therethrough, the plenum chamber defining an insulating air space to reduce heat loss at the light admitting areas.

It is another object of this invention to provide a novel building heating system employing solar energy including a peripheral, plenum chamber comprising an exterior translucent panel and an interior translucent panel, said plenum chamber permitting direct radiation building heating by passage of solar energy through both translucent panels, indirect convection building heating by directing the heated air from within the plenum chamber into the building and conduction building heating by heat passage through the interior plenum chamber wall into the building.

Other objects and a fuller understanding of the invention will be had by referring to the following description and claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Although specific terms are used in the following description for the sake of clarity, these terms are intended to refer only to the particular structure of our invention selected for illustration in the drawings and are not intended to define or limit the scope of the invention.

Figure 1:
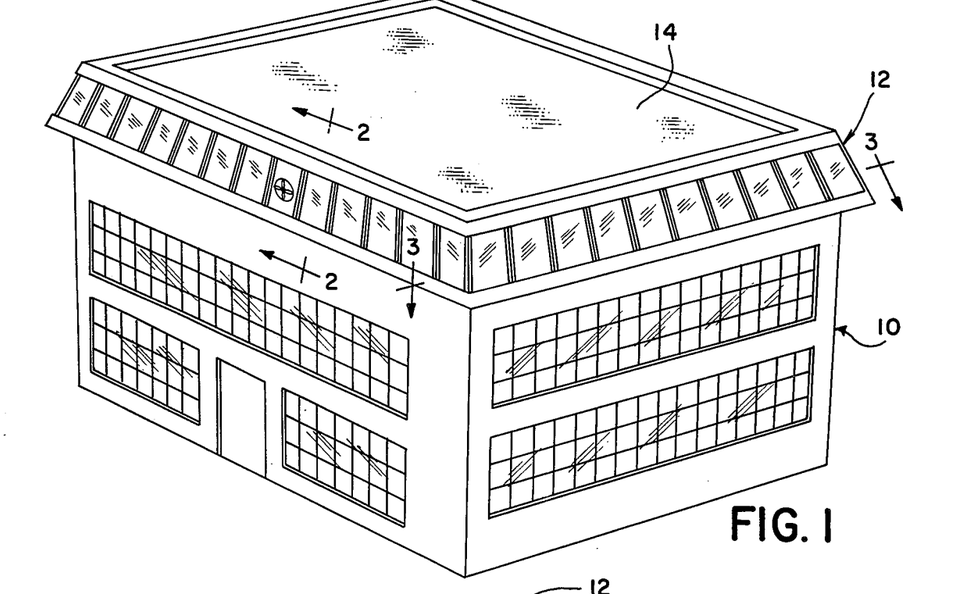
FIG. 1 is a perspective view of a building equipped with a solar heating system in accordance with the present invention.

Referring now to the drawings, in FIG. 1 is illustrated a building 10 which includes a solar heating component 12 installed at or near the roof 14. In the embodiments illustrated, the solar heating component 12 extends completely about the perimeter of the building at the roof thereof. It is noteworthy that the component 12 forms an integral portion of the building, and preferably is fabricated to an attractive, aesthetically pleasing appearance. The parapet-like component 12 may encompass only a portion of the building perimeter and still fall within the meaning and intent of this invention.

Figure 2:
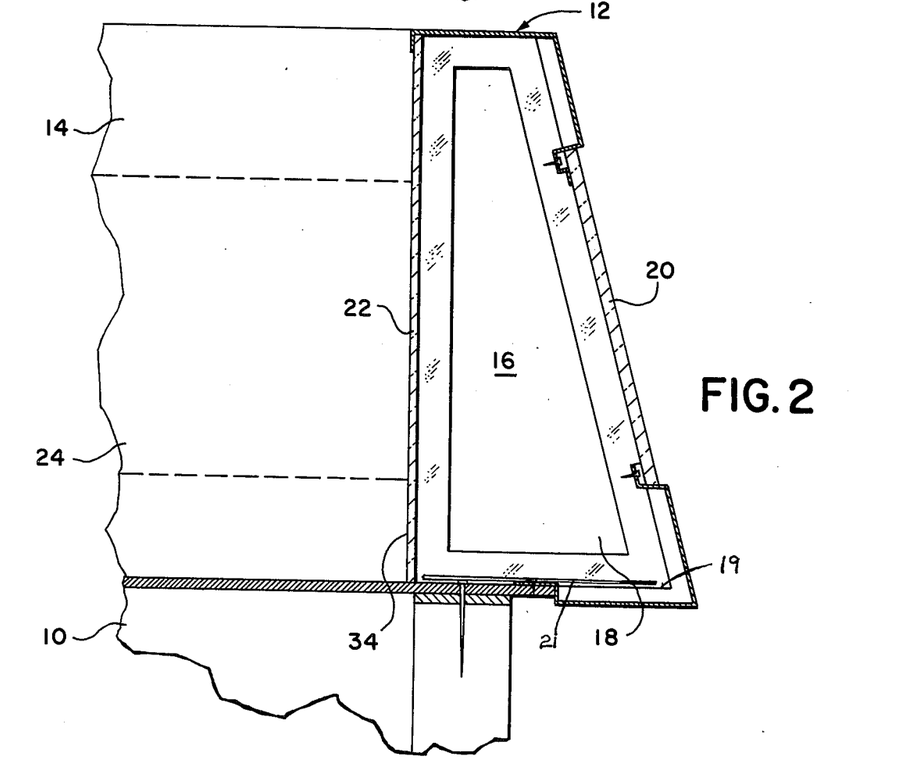
FIG. 2 is a partial, enlarged, cross-sectional view taken along Line 2—2 of FIG. 1, looking in the direction of the arrows.
Figures 3, 4, 5:
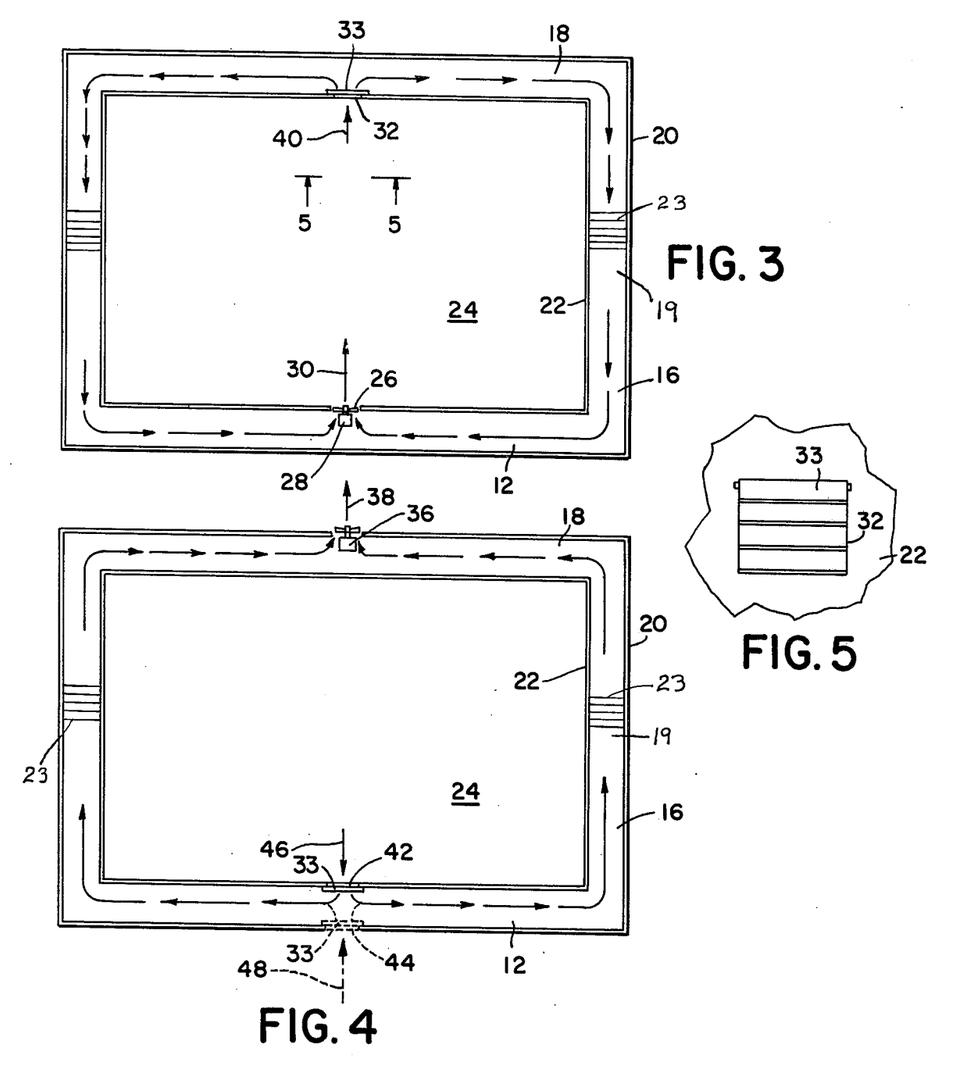
FIG. 3 is a cross-sectional view taken along Line 3—3 of FIG. 1, looking in the direction of the arrows, showing a preferred building heating arrangement.
FIG. 4 is a view similar to FIG. 3, showing the system modified for building cooling purposes.
FIG. 5 is an enlarged, partial, elevational view of a louvered opening, looking from Line 5—5 of FIG. 3.
Figure 3:
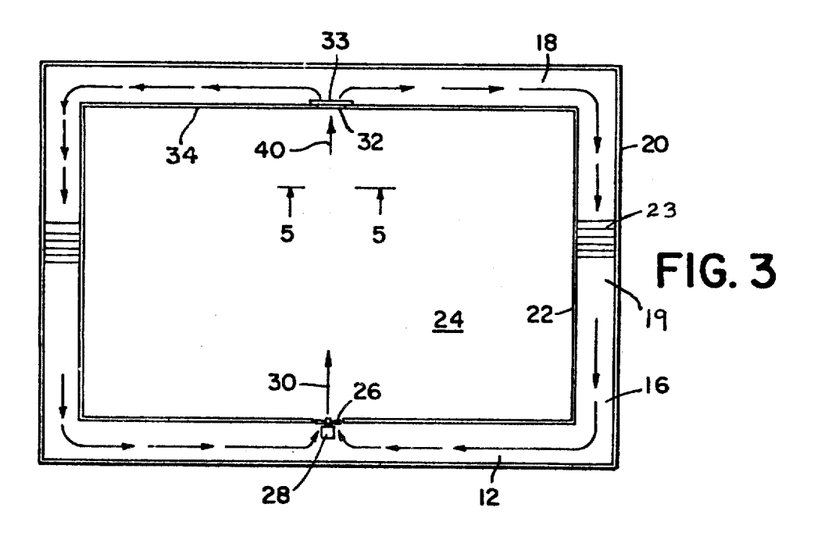
Figure 4:
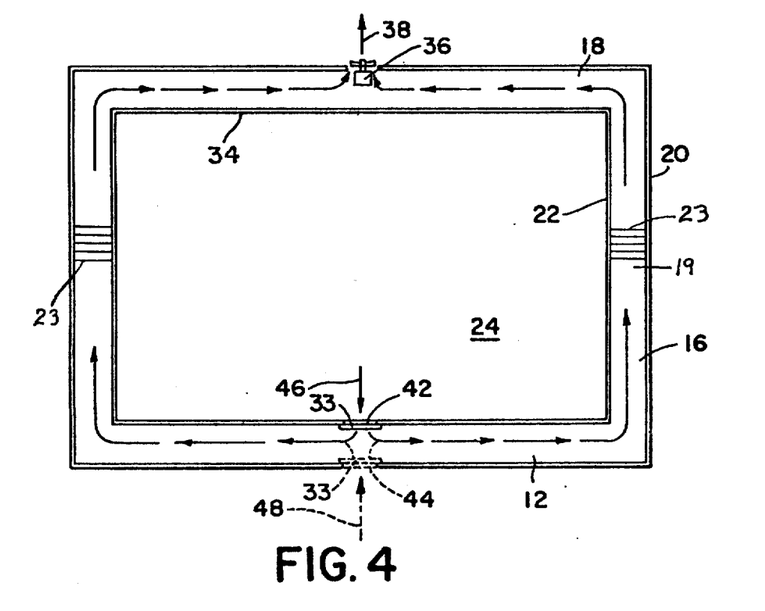

As best seen in FIGS. 2 and 3, the solar heating component 12 is fabricated to define an interior space 16 which extends throughout the length of the solar heating component. In the embodiment illustrated, the hollow interior space 16 completely encircles the building and forms a continuous, peripheral, communicating plenum chamber 18. The plenum chamber 18 is defined exteriorly by a plurality of juxtaposed translucent panels 20, upon which the rays from the sun (not shown) directly impinge. The panels 20 may be fabricated of clear or tinted glass, clear or tinted plastics such as "Plexiglas" or other suitable translucent material. Tinted materials are preferable in that they tend to reduce glare and to increase the heat capacity of the system. As best seen in FIG. 2, the exterior panels 20 are preferably inclined from the vertical and are positioned at approximately a thirty degree angle from the vertical. The angular inclination of the translucent exterior panels 20 approximates the normal to the average direction of the rays from the sun in an average northern latitude. By angularly inclining the exterior panels 20, the maximum heating effect of the sun's rays can be utilized. The panels 20 may be planar or shaped, such as lens-shaped.

The bottom section 19 of the solar heating component 12 is usually exposed to direct impingement of rays from the sun which pass through the translucent exterior panels 20. This construction can be employed during the heating season to advantage by providing a dark covering 21 to attract and to retain solar heat. In a first embodiment, the covering material 21 can be a flexible mat or other construction, having a dark surface on one side and a light, reflecting surface on the other. In this manner, the covering 21 can be applied over the bottom section 19 with the dark side up during the heating season and with the light side up during the period when solar heat is not required for building heating purposes. In an alternate construction, the plenum bottom can be equipped with a plurality of pivotally arranged louvers 23 which are illustrated schematically in FIGS. 3 and 4. It is contemplated that each blade could be painted on one side with a dark color and on the other with a light color. The blades could then be pivoted to a desired position depending upon the season. In such a construction, it would be desirable to so construct the plenum bottom 19 that the louvers 23 would form the bottom closure. In this manner, the louver blades could be pivoted to a position other than horizontal when desired to provide greatly increased ventilation.

The plenum chamber 18 is defined interiorly by a second translucent panel 22, which panel separates the hollow interior space 16 of the plenum chamber 18 from the building interior space 24. Each second panel 22 is preferably fabricated of clear glass or sheet plastic material to facilitate passage of light therethrough. The second panels may be planar or shaped, such as lens-shaped. It is noteworthy that the construction of the plenum chamber 18 permits both heat and light to enter the building interior 24, from the outside by permitting passage of sunlight directly through both of the translucent panels 20, 22. The double wall construction of the plenum chamber forms a natural insulated construction to insulate the building at the light entering areas when there is no sun. It is contemplated that the solar energy will directly heat the air that is confined within the plenum chamber 18 to raise the temperature thereof.

The heated atmosphere within the plenum chamber 18 will pass through the translucent interior panels 22 to thus serve to heat the building interior space 24 by conduction. It will be noted that the exterior panels 20 and the interior panels 22 are fabricated of translucent materials. Accordingly direct sunlight can penetrate both panels simultaneously to thereby additionally heat the building interior 24 by direct sun radiation.

As best seen in FIGS. 3 and 4, the plenum chamber 18 preferably forms an endless, peripheral space within which the contained air may be heated by rays from the sun from any direction. One or more heating fans 26 are installed with the fan suction 28 communicating with the hollow interior space 16 of the plenum chamber 18 to draw heated air therefrom, for building heating purposes by convection. The fan or fans 26 may be of any suitable design and preferably are of the multi-vane type to permit their use with building heating ductwork which is indicated schematically at 30. It is contemplated that the ductwork 30 may be directed throughout the building to distribute the heated air from the plenum chamber 18 in accordance with design practices well known to those skilled in the art of warm air heating.

One or more openings 32 are provided in the plenum chamber 18 on the building side 34 to provide make up air into the plenum chamber 18 to replace the solar heated air as it is exhausted upon operation of the heating fans 26. Preferably, the plenum chamber make up air openings 32 are remotely located from the location of the fans 26 to facilitate air circulation and to prevent short cycling. If desired, motor operated or gravity type louvers 33 (FIG. 5) can be provided at each opening 32. In accordance with usual practice, the louvers 33 will open upon operation of the fan or fans 26 to recirculate air from within the building in the direction of the arrow 40.

In accordance with the present design, it will be observed that three distinct solar heating facilities are provided for the building interior 24 upon utilizing the solar heating component 12 of the present system. As hereinbefore set forth, direct rays of the sun can direct heat to within the building interior by impinging upon the exterior panels 20, passing through the translucent exterior panels 20 and the interior panels 22 to thereby directly strike portions of the building interior. Secondly, the rays from the sun pass through the translucent exterior panels 20 and heat the air within the plenum chamber 18 to thereby raise the temperature within the plenum chamber. The temperature differential between the plenum chamber 18 and the building interior space 24 functions to transmit heat from the plenum chamber into the building interior by conduction through the interior panels 22. Thirdly, the heating fan or fans 26 draw heated air from within the plenum chamber 18 and exhaust the heated air from within the plenum chamber interior space 16 indirectly into the building interior 24 to provide a third method (i.e. convection) of utilizing heat from the sun for building heating purposes.

In the embodiment illustrated, the plenum chamber 18 is designed to completely encircle the periphery of the building 10 at the roof line 14 thereof to thereby receive the maximum direct rays from the sun during all daylight hours to thereby maximize utilization of the solar heat energy available when the sun shines.

In a first modification of the solar heating system of the present invention as illustrated in FIG. 4, during summer months when exterior heat sources are not required, the plenum chamber 18 may be utilized for summer cooling by providing an exhaust fan or fans 36 positioned to exhaust through one or more of the exterior panels 20 in the direction of the arrow 38. Openings 42 between the building interior space 24 and the plenum chamber 18 may be utilized to provide make up air into the plenum chamber 18 as indicated by the arrow 46 to replace the air exhausted by the exhaust fan 36. It is contemplated that the openings 42 can be equipped with gravity type or motor operated louvers 33 to thereby permit the louvers to be functioned when the exhaust fans 36 operate. In this manner, summer cooling by ventilation can be provided.

As an alternate type of design, an exterior opening 44 can be provided in one or more exterior panels 20 in lieu of the interior positioned opening 42. In this embodiment, outside make up air will be drawn into the plenum chamber 18 as indicated by the arrow 48 upon function of the fan 36. Such a design can be employed to prevent a build-up of solar heat within the plenum chamber.

Any plastic material which is capable of being formed into adequately rigid sheets or similar structures can be used in the structure of the invention. A highly desirable group of plastics includes the acrylates and methacrylates and copolymers. Other suitable plastics are the following: allyldiglycol carbonate, cellulose acetate, cellulose triacetate, other celluloses, fluroplastics SEP, fluroplastics TFE, polycarbonate, polyester, polyethylene terephthalate, polyimide, polyprofalene, polystyrene, polyvinyl alcohol, polyvinyl chloride, epoxy nylons, phenolic, styrene and copolymers, polyurethane acrylic (acrylates, methacrylates and copolymers) cellulose acetate butyrate, cellulose nitrate, cellulose propionate, fluro plastic CTFE, polycarbonate, polyethylene and copolymers, polyethylene oxide polymers, polyurethane elastomer, polyvinyl chloride and copolymers plasticized (calendared), polyvinyl chloride and copolymers plasticized (extruded), polyvinyl chloride and copolymers rigid (calendered), polyvinyl chloride and copolymers rigid (extruded), polyvinyl fluoride, polyvinylidene chloride, polyvinylidene fluoride, SAN (acrylonitrile styrene copolymers), polysulfone, ABS (acrylnitrile butadiene styrene copolymer), acetal and copolymer, cellulose acetate, cellulose acetate butyrate, cellulose ethyl, cellulose methyl, cellulose nitrate, fluoro plastics CTFE, phenolic phenoxy polycarbonate, polypropylene, polystyrene polyurethane elastomer (solid), polyvinyl chloride and copolymers (plasticized) polyvinyl chloride and copolymers (rigid), polyvinyl fluoride, polyvinyledene chloride, polyvinyledene fluoride, reinforced plastics, phenylene oxide. These, of course, should be adequately translucent to let the solar energy pass through the plastics.

We claim:

1. An architectural parapet-like component for solar heating a building which component is multi-functional and particularly adapted to attract solar heat for heating the interior of the building, decrease sun glare, allow the viewing of the outside from the inside of the building and allow for daylight to provide light into the building, which component comprises an endless plenum chamber defining an endless air space, the plenum comprising a first panel permitting passage of a predetermined amount of natural light and of solar energy to heat the air within the air space, the first panel being positioned towards the exterior of the building, a second panel being positioned closer to the interior of the building than the first panel and permitting passage of a predetermined amount of natural light and of solar energy, the first panel being darker than the second panel and having a greater absorption for solar energy than the second panel, the panels thereby allowing passage of heat and light to the interior of the building and providing a clear and unobstructed view of the outside from the inside of the building.

2. The component of claim 1 wherein the plenum chamber is adapted to confine and circulate the air heated by solar heat on one side of the building through the plenum and to the other side of the building.

3. The component of claim 1 wherein one of the panels is inclined relative to the other.

4. The component of claim 3 wherein the first panel is angularly inclined from the vertical, thereby further minimizing glare.

5. The component of claim 4 wherein the angular inclination approximates the normal to the average direction of the rays from the sun in an average northern latitude.

6. The component of claim 1 wherein the second panel is free of insulating material adapted to prevent heat transfer to the interior of the building.

7. The component of claim 1 wherein a panel is plastic.

8. The component of claim 7 wherein the plastic is an acrylic plastic.

9. The component of claim 8 wherein the plastic is selected from the group including an acrylate, a methacrylate amd copolymers thereof.

10. The component of claim 7 wherein the plastic is tinted.

11. The component of claim 7 wherein a panel is glass.

12. The component of claim 1 wherein both panels are plastic.

13. The component of claim 12 wherein the first panel is translucent and the second panel is clear.

14. The component of claim 12 wherein the first panel is dark and the second panel is lighter than the first panel.

15. The component of claim 14 wherein the second panel is transparent.

16. The component of claim 12 wherein the first and second panels are of a translucent acrylic plastic material, the first panel being darker than the second panel.

17. The component of claim 12 wherein the first panel is gray and the second panel is colorless.

18. The component of claim 12 wherein the first panel is bronze color and the second panel is colorless.

19. The component of claim 12 wherein the first panel is neutral gray and the second panel is colorless.

20. The component of claim 12 wherein the first panel is neutral gray with a visible light transmittance and energy transmittance of at least 50%, and the second panel is colorless.

21. The component of claim 1 wherein the plenum chamber in which the air is heated and circulated to the interior of the building extends substantially completely about the outer periphery of the building.

22. The component of claim 1 and means for air passage from the plenum into the building, thereby allowing for controllable warm air movement to flow from the side of the plenum which is exposed to solar heating to the other side and from there into the building, and for air from the side of the plenum which is not exposed to solar heating to flow to the side which is exposed to solar heating.

23. The component of claim 1 wherein the chamber comprises a heat attracting cover positioned inside the chamber generally at the bottom thereof.

24. The component of claim 23 wherein the cover has a dark surface and a light surface.

25. The component of claim 23 wherein the cover is flexible.

26. The component of claim 23 wherein the cover comprises a plurality of louvers.

27. The component of claim 26 wherein the louvers are pivoted from a solar energy attracting position to a solar energy reflecting position.

28. The component of claim 1 wherein the first panel is tinted dark.

29. The component of claim 28 wherein the second panel is a clear translucent member.

30. The component of claim 1 wherein both panels consist of a single layer.

31. The component of claim 30 wherein the first panel is tinted gray or bronze and the second panel is transparent.

32. A solar heating method for attracting heat and providing natural light to the interior of a building provided with a solar-heating component particularly adapted to attract solar heat for heating the interior of the building, decrease sun glare, allow the viewing of the outside from the inside of the building and allow for daylight to provide light into the building, which component comprises an endless air chamber, the component having a first panel positioned toward the exterior of the building which is adapted to transmit therethrough a predetermined amount of solar radiation and natural light, and a second panel positioned closer to the interior of the building than the first panel, which panel also is adapted to permit passage of a predetermined amount of solar radiation and natural light, the first panel being darker than the second panel and having a greater absorption for solar energy than the second panel, which method comprises:
  exposing the component to solar radiation;
  passing a predetermined amount of solar radiation which impinges on the first darker panel through that panel, while concurrently
  absorbing impinging solar radiation in that first darker panel;
  passing the solar radiation transmitted through the first darker panel through the second lighter panel, which has a lesser absorption for solar radiation than the first darker panel, and into the building provided with the component;
  heating the air within the chamber using the heat provided by the solar radiation absorbed by the first darker panel; and
  passing visible natural light through the first and second panels into the building,
  whereby solar radiation and visible light are transmitted through the component to the building.

33. The method of claim 32 including the step of confining air within the chamber for insulating the building when there is no sun.

34. The method of claim 32 which further comprises heating the air which is not exposed to direct impingement of solar rays by circulating with it the air which is heated by direct impingement of solar rays.

35. The method of claim 32 which further comprises using a portion of the solar energy from inside the chamber to transfer heat through the second lighter panel to the inside of the building.

36. The method of claim 32 which further comprises
withdrawing heated air from the chamber by forcing the heated air from the chamber into the building, and
circulating air within the chamber toward the location where heated air is withdrawn and forced into the building,
whereby heated air is provided to the interior of the building for heating purposes.

37. The method of claim 36 which further comprises drawing make-up air into the chamber concurrently with forcing heated air from the chamber.

* * * * *

UNITED STATES PATENT OFFICE
CERTIFICATE OF CORRECTION

Patent No. 4,121,764            Dated October 24, 1978

Inventor(s) Henry F. Hope et al.

It is certified that error appears in the above-identified patent and that said Letters Patent are hereby corrected as shown below:

The sheets of drawings containing Figures 1, 3 and 4 should be canceled and the following figures substituted therefor.

Signed and Sealed this

Eighth Day of May 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,121,764
DATED : October 24, 1978
INVENTOR(S) : Henry F. Hope and Stephen F. Hope It is certified that error appears in the above-identified patent and that said Letters Patent are hereby corrected as shown below:

FIG. 1

UNITED STATES PATENT AND TRADEMARK OFFICE
CERTIFICATE OF CORRECTION

PATENT NO. : 4,121,764

DATED : October 24, 1978

INVENTOR(S) : Henry F. Hope and Stephen F. Hope

It is certified that error appears in the above-identified patent and that said Letters Patent are hereby corrected as shown below:

FIG. 3

UNITED STATES PATENT AND TRADEMARK OFFICE
CERTIFICATE OF CORRECTION

PATENT NO. : 4,121,764

DATED : October 24, 1978

INVENTOR(S) : Henry F. Hope and Stephen F. Hope

It is certified that error appears in the above-identified patent and that said Letters Patent are hereby corrected as shown below:

FIG. 4